March 6, 1934. H. C. PRESTON 1,950,036
CORD CLAMP FOR PORTABLE ELECTRIC TOOLS
Filed May 29, 1929
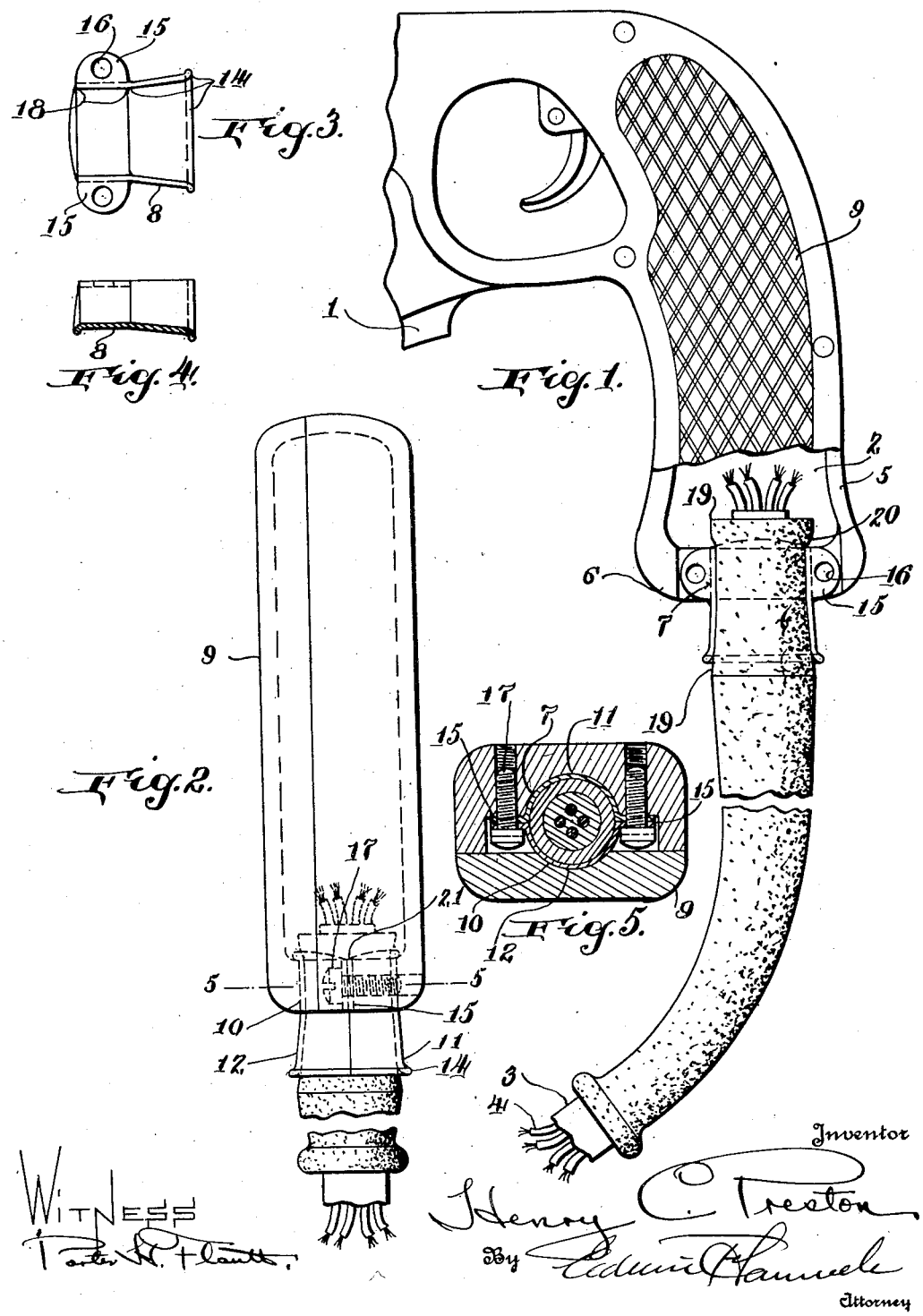

Patented Mar. 6, 1934

1,950,036

UNITED STATES PATENT OFFICE 1,950,036

CORD CLAMP FOR PORTABLE ELECTRIC TOOLS

Henry C. Preston, Towson, Md., assignor to The Black & Decker Manufacturing Company, Towson, Md., a corporation of Maryland Application May 29, 1929, Serial No. 366,870

4 Claims. (Cl. 247—13)

In the operation of manually portable electric tools, one of the chief sources of inconvenience and loss of time is due to the tendency of the cord which encloses the conducting wires to become ruptured where it enters the tool. Such ruptures are due to the rough usage in the nature of pulling and jerking, particularly in lateral directions, to which the cord is subjected when the tool is used. These ruptures bring the positive and negative wires in contact and cause failure by short circuiting. In other instances, the connections which join the external wires to the internal circuit of the tool become loosened and disengaged, breaking the circuit and rendering the tool inoperative.

The object of the present invention is to overcome these difficulties and provide a cord holding means whereby all tendency to rupture the cord is completely avoided, the cord being so firmly held as to remove all strain from the electrical connections whereby the outside wires are joined to the internal circuit within the tool.

The construction comprises a new and improved tubular clamping member shown as operated in connection with a cord protector of rubber or similar material which encloses the cord where it enters the tool and extends outwardly therefrom for several inches along the cord. This cord protector in the preferred form has a reducing taper as it recedes from the tool, permitting it to conform to the cord, the lateral resistance of the protector being sufficient to cause it to assume under all circumstances a curved outline, resisting any tendency to bend the cord at a sharp angle. This cord protector is described in United States Patent No. 1,574,020 being the property of the assignee of the present application. The combination of the protector with the clamp is desirable but not essential to the useful operation of the clamp. While the term cord protector has the specific meaning as defined above, it may also be applied to any yielding or resilient covering enclosing the conducting wires.

This cord protector, or the cord, if the protector is omitted, is gripped by the tubular clamp, forming a shoulder on the protector or cord which prevents it from being pulled out of the clamp, the cord protector being in contact with the clamp for an appreciable length, increasing the resistance to the removal of the cord protector from the clamp. By the combination of the tubular clamp and cord protector, a uniform pressure is applied to the cord tending to prevent cutting and rupture of the cord and consequent short circuits, and affording a support for the cord protector and cord which extends along the cord giving a relatively large area of contact between the clamp and the part being clamped. The outer end of the tubular clamp is also preferably given a diverging taper or bell shape which avoids any tendency to cut or shear or cramp the cord or cord protector due to sharp bending by lateral pulls and jerks. The clamp is also so constructed as to give a uniform pressure around the entire circumference of the cord or protector and prevent cutting. In the accompanying drawing I have illustrated a portion of a portable electric tool equipped with a cord-holding means.

In the drawing:

Figure 1 is a side elevation of the grip or switch compartment of an electric tool equipped with the cord holding means of the invention, the cover of the compartment being removed.

Figure 2 is a rear elevation of the same.

Figures 3 and 4 are detail views of a section of the clamp.

Figure 5 is a section on line 5—5 in Figure 2.

Referring to the drawing by numerals, each of which is used to indicate the same or similar parts in the different figures, the construction shown comprises a fragmentary illustration of a manually portable power driven tool 1, having a switch compartment which may be included in the grip 2 or other convenient portion of the casing to which the electric cord or cable 3 enclosing the conducting wires 4 may be attached, the point of clamping the cord to the tool being more or less remote from the switch, as may be found convenient or desirable.

In the form of the invention shown, the switch box or compartment 2 is formed with a semicircular notch or depression in the edge or cover seat 5 at a convenient point which is shown as at the butt end 6 of the grip, the depression or notch being indicated by reference character 7. The cord clamp proper 8 is seated in the notch or seat 7 and covered by the switch box cover 9 which is slightly cut away or notched at 10 to conform to the cord clamp. The cover is, however, not essential to the operating of the clamp.

The cord clamp 8 is preferably formed as shown in Figures 3, 4 and 5 in two parts, 11 and 12, which are shown as of semicircular cross section, i. e. divided in a plane of the axis and slightly flared at the outer end at 14, and being otherwise when combined preferably of cylindrical or other tubular form, as the circular cross section is not essential under all circumstances. As shown, each half or section 11—12 is provided with suitable fastening means, as ears 15, which ears are apertured at 16 to admit screws or other holding means 17 whereby the sections are drawn together and secured to the tool casing, the corresponding apertures being in registration when the parts are assembled.

While the opening 14 at the outer end of the clamp has been described as slightly flared outwardly from the cylindrical, the portion 18 near the other end of the clamp is shown as substantially cylindrical and the ears 15 are preferably annexed to the cylindrical portion.

In accordance with the preferred form of the invention, the diameter of the cylindrical end portion 18 of the clamp is somewhat less than the diameter of the rubber cord protector 19 as to the portion thereof which is enclosed therein or of the cord so that the clamp when drawn together by means of the screws 17 tends to constrict the cord or protector 19 which latter is an elongated conical member of resilient rubber enclosing the inner end of the cord where it passes through the casing or switch box wall extending outwardly along the cord for several inches. By this constriction of the cord protector a shoulder 20 is formed thereon which prevents it from being pulled out of the clamp, also the cylindrical portion 18 of the clamp is in contact with the cord protector for an appreciable extent giving a further resistance against removal of the cord protector, while the flaring portion 14 of the protector provides for the support of the protector for a distance outwardly from the constricted portion which eliminates any tendency to injure the protector and cord by bending them sharply around the edges of the clamp when said members are flexed by pulling to the side.

Another important feature of the invention is that the inside diameter of the clamp is but slightly less than the corresponding dimension of the cord or protector and the two halves of the clamp abut at 21, giving a circular cross section with uniform contact pressure throughout the circumference of the cord or protector. This shoulder prevents the clamp from closing beyond a predetermined point so that there is no tendency to pinch or unduly constrict the cord or protector causing it to be injured by cutting.

In the operation of the invention, undue constriction of the cord being prevented by the meeting of the edges as already described, a uniform pressure on the cord at this point is obtained tending to prevent short circuits in the wires enclosed within the cord which will occur in the absence of such protection. At the same time the clamp provides a support for the member, being clamped, i. e., the protector, or cord, and an opportunity for it to be flexed without sharp bends, and provides a relatively large area of contact between the clamp and the protector or other part being clamped.

Further, the protector cooperates with the cylindrical clamp thus spaced and regulated as to the extent of closing by the contact at its edges, transmitting to the cord through the protector a uniformly distributed pressure which holds the cord and protector without any tendency to injure the cord.

I have thus described specifically and in detail a cord holding device for portable electric tools, embodying the features of my invention in the preferred form in order that the nature and manner of constructing and using the same may be clearly understood. However, the specific terms herein are used descriptively rather than in a limiting sense, the scope of the invention being defined in the claims.

What I claim as new and desire to secure by Letters Patent is:

1. The combination with a casing for a portable power driven electric tool of a conducting cord and a resilient protector enclosing the same, and a tubular clamp formed in two similar sections, with means for holding the sections together and securing them to the casing, said sections being drawn together by said holding means to grip the protector, the sections having mutually contacting portions at their adjacent edges giving a predetermined diameter of the clamp when closed, the inside diameter of the tubular clamp being when thus in contact slightly less than the outside diameter of the protector whereby the protector is constricted to a limited and predetermined degree as the clamp is closed, preventing slipping of the protector and cord.

2. The combination with a portable power driven electric tool of a casing, a conducting cord, a resilient protector enclosing the same and a tubular clamp for clamping said protector, said clamp being formed in semi-circular sections with means for holding the sections together and securing them to the casing, said sections being drawn into contact by said holding means to grip the protector, the tubular clamp having a minimum predetermined diameter slightly less than the diameter of the protector whereby the closing of the sections is caused to constrict the protector forming a shoulder on the protector at the side of the clamp adjacent the casing preventing slipping of the protector, the cord adapted to be held by the protector within the constricted area.

3. The combination with an electric power driven tool of a tool casing, a conducting cord, a resilient protector for said cord adjacent the tool casing enclosing the cord and a tubular clamp having semi-circular sections adapted to fit about one end of the protector and having a flared outer portion and a tubular inner portion, said inner portion being of slightly less inside diameter than the diameter of the protector, means for holding the clamp sections in contact and securing said clamp to the casing, the protector being adapted to be constricted about its clamped portion, the cord being held by the constricted portion of the protector.

4. The combination with the casing of a portable power driven electric tool having switch mechanism of a conducting cord and a resilient protector, said protector being fitted about the cord adjacent the casing to prevent pinching or cutting of the cord at this point, a tubular clamp in semi-circular sections adapted to fit about one end of the protector, said clamp being provided with holding means for holding the sections in contact and to secure said clamp sections to the casing, the clamp having a flared outer portion and a cylindrical inner portion, said inner portion being of slightly less inside diameter than the diameter of the protector whereby the resilient protector will be constricted to a predetermined degree by the smaller diameter of the clamp, the conducting cord being adapted to be held within the constricted portion of the protector.

HENRY C. PRESTON.